US012634222B2

(12) United States Patent
Yadav et al.

(10) Patent No.: US 12,634,222 B2
(45) Date of Patent: *May 19, 2026

(54) COMPUTING FORWARD AND REVERSE PATHS AND CHECKING THE LIVENESS THEREOF

(71) Applicant: Ciena Corporation, Hanover, MD (US)

(72) Inventors: Bhupendra Yadav, Ottawa (CA); Senthil Balakrishnan, Kanata (CA); Shashanka Shobhit Shankara, Stittsville (CA)

(73) Assignee: Ciena Corporation, Hanover, MD (US)

( * ) Notice: Subject to any disclaimer, the term of this patent is extended or adjusted under 35 U.S.C. 154(b) by 40 days.

This patent is subject to a terminal disclaimer.

(21) Appl. No.: 18/837,238

(22) PCT Filed: Feb. 24, 2023

(86) PCT No.: PCT/US2023/013780
§ 371 (c)(1),
(2) Date: Aug. 9, 2024

(87) PCT Pub. No.: WO2023/164104
PCT Pub. Date: Aug. 31, 2023

(65) Prior Publication Data
US 2025/0175412 A1 May 29, 2025

Related U.S. Application Data

(63) Continuation of application No. 17/682,294, filed on Feb. 28, 2022, now Pat. No. 12,052,161.

(51) Int. Cl.
H04L 45/24 (2022.01)
H04L 45/12 (2022.01)
(Continued)

(52) U.S. Cl.
CPC ............ *H04L 45/123* (2013.01); *H04L 45/24* (2013.01); *H04L 45/42* (2013.01); *H04L 45/50* (2013.01)

(58) Field of Classification Search
CPC ....... H04L 45/123; H04L 45/24; H04L 45/42; H04L 45/50
See application file for complete search history.

(56) References Cited

U.S. PATENT DOCUMENTS 9,497,107 B1 * 11/2016 Akiya ................. H04L 43/0811
10,469,367 B2 11/2019 Filsfils et al.
(Continued)

FOREIGN PATENT DOCUMENTS

| CN | 108768788 A | 11/2018 |
| CN | 111917643 A | 11/2020 |
| EP | 3731473 A1 | 10/2020 |

OTHER PUBLICATIONS

May 30, 2023, International Search Report and Written Opinion for International Patent Application No. PCT/US2023/013780.

*Primary Examiner* — Emmanuel L Moise
*Assistant Examiner* — Xiang Yu
(74) *Attorney, Agent, or Firm* — Baratta Law PLLC; Lawrence A. Baratta, Jr.

(57) ABSTRACT

Systems and methods for computing forward and reverse paths and checking the liveness, keep-alive status, or continuity of the forward and reverse paths are provided. A method (90), according to one implementation, includes the step of creating (92) one or more messages related to a computation of a forward path from a head-end node (12, 32) to a tail-end node (14, 34) and a computation of a reverse path from the tail-end node (14, 34) to the head-end node (12, 32). The method (0) also includes the step of adding (94) a data object to the one or more messages, the data
(Continued)

object including an intent to check the liveness of the forward path and reverse path.

20 Claims, 5 Drawing Sheets

(51) Int. Cl.
H04L 45/42 (2022.01)
H04L 45/50 (2022.01)

(56) References Cited

U.S. PATENT DOCUMENTS

| | | | |
|---|---|---|---|
| 10,595,484 B2 | 3/2020 | Chauhan et al. | |
| 2014/0098710 A1 | 4/2014 | Ong | |
| 2015/0381324 A1* | 12/2015 | Mirsky | H04L 45/22 |
| | | | 370/241.1 |
| 2020/0351197 A1* | 11/2020 | Zhan | H04L 45/34 |
| 2021/0266251 A1 | 8/2021 | Yadav et al. | |

* cited by examiner

| 0 0 0 0 0 0 0 0 0 0 1 1 1 1 1 1 1 1 1 1 2 2 2 2 2 2 2 2 2 2 3 3 |
| 0 1 2 3 4 5 6 7 8 9 0 1 2 3 4 5 6 7 8 9 0 1 2 3 4 5 6 7 8 9 0 1 |

| Type | Length | Flags | I | C |
|------|--------|-------|---|---|
| My Discriminator |||||
| Your Discriminator |||||

50

| 0 0 0 0 0 0 0 0 0 0 1 1 1 1 1 1 1 1 1 1 2 2 2 2 2 2 2 2 2 2 3 3 |
| 0 1 2 3 4 5 6 7 8 9 0 1 2 3 4 5 6 7 8 9 0 1 2 3 4 5 6 7 8 9 0 1 |

| Type (28) | Length (4) |
|-----------|------------|
| Reserved | PST |

60

70

72

PROCESSING DEVICE

MEMORY DEVICE 74

84

PATH COMPUTING AND LIVENESS CHECKING UNIT

82

76 INPUT/OUTPUT INTERFACES

78 NETWORK INTERFACE

80 DATABASE

36 NETWORK

*90*

START

CREATE ONE OR MORE MESSAGE RELATED TO A COMPUTATION OF A FORWARD PATH FROM A HEAD-END NODE TO A TAIL-END NODE AND A COMPUTATION OF A REVERSE PATH FROM THE TAIL-END NODE TO THE HEAD-END NODE — *92*

ADD A DATA OBJECT TO THE ONE OR MORE MESSAGES, THE DATA OBEJCT INCLUDING AN INTENT TO CHECK THE LIVENESS OF THE FORWARD PATH AND REVERSE PATH — *94*

END

COMPUTING FORWARD AND REVERSE PATHS AND CHECKING THE LIVENESS THEREOF

TECHNICAL FIELD

The present disclosure generally relates to networking systems and methods. More particularly, the present disclosure relates to creating messages related to the computation of forward and reverse paths between two nodes in a network and adding an intent to check the liveness of the forward and reverse paths in the messages.

BACKGROUND

Generally, path computation is a technique for computing one or more serviceable paths between two nodes in a network (e.g., communications network). For example, Path Computation Element Protocol (PCEP), which is also referred to as Path Computation Element Communication Protocol, is defined in multiple Requests for Comments (RFCs) and extensions thereof, such as RFC 5440, RFC 8231, RFC 8281, etc. These RFCs define the communication between a Path Computation Client (PCC) and a Path Computation Element (PCE) and/or the communication between PCEs. The path computation may include Multi-protocol Label Switching (MPLS) techniques for obtaining Label Switched Paths (LSPs).

For example, RFC 8231 defines an extension to PCEP for enabling "stateful" control of LSPs within and across PCEP sessions. Also, this extension includes a mechanism synchronize states of the LSPs between PCCs and PCEs, delegating control over LSPs to PCEs, and controlling the timing and sequence of path computations within and across PCEP sessions.

RFC 8281 is an extension of PCEP for enabling stateful control of LSPs between and across PCEP sessions. In addition to effecting synchronization, delegating control, and path computation sequence control, this extension further includes a mechanism where LSPs are configured on the PCC and control is delegated to the PCE. This extension also describes the setup, maintenance, and teardown of PCE-initiated LSPs under the stateful PCE model. This can be done without the need for local configuration on the PCC, thus allowing for a dynamic network that is centrally controlled.

Also, RFC 8408 describes PCEP for communication between a PCC and PCE or between two PCEs. A PCC may be configured to request, from a PCE, a path subject to various constraints and optimization criteria. The PCE responds to the PCC with an Explicit Route Object (ERO), which defines a hop-by-hop path. The PCC can then use this ERO to set up the path in the network. The PCE may modify the path of an LSP by sending a new ERO. The PCC uses the new ERO to reroute the LSP. The PCE may dynamically instantiate an LSP on a PCC by sending the ERO and the characteristics of the LSP. The PCC can create the LSP using the ERO and other attributes sent by the PCE.

Therefore, PCEP may include a set of rules that allows a PCC to request path computations from a PCE and the PCE can reply with specific responses. However, path computation defined in PCEP is typically configured for a forward-directed path and does not define reverse-directed paths. Thus, there are no provisions in the conventional protocols for achieving an automated reverse path computation. Instead, network operators must manually configure the return path, even if forward path is already computed by PCEP. Manual path configuration processes may be prone to errors and can be time consuming and therefore can introduce problems in network planning. Also, manual path computation can be problematic, particularly when the forward or reverse paths cross administrative boundaries, even if they belong to the same service provider. Therefore, there is a need in the field of path computation systems to automatically compute forward and reverse paths. Also, there is a need in this field to automatically set up a strategy for checking the liveness of these newly computed paths, which currently is absent from conventional path computation protocols.

BRIEF SUMMARY

The present disclosure is directed to systems, methods, non-transitory computer-readable media, protocols, etc. for performing path computation procedures in a network. The path computation systems and methods of the present disclosure are configured to automatically compute forward and reverse paths from one node to another. Also, the present disclosure further defines the path computation systems and methods to include an automatic establishment of an intention to run liveness checking on these newly created forward and reverse paths.

For example, a system for computing paths and checking the liveness of the paths, according to one implementation, may include a processing device and a memory device configured with computer logic having instructions to enable the processing device to perform specific path computation and liveness checking procedures. In this implementation, the processing device may be configured to create one or more messages related to a computation of a forward path from a head-end node to a tail-end node and a computation of a reverse path from the tail-end node to the head-end node. The instructions also enable the processing device to add a data object to the one or more messages. The data object includes an intent to check the liveness of the forward path and reverse path.

According to additional embodiments, the instructions may further enable the processing device to automatically compute the forward path and reverse path, where the forward path and reverse path may traverse multiple administrative domains, network domains, and/or autonomous systems, which thereby separate the head-end node from the tail-end node by border nodes, transition points, and/or gateways. The step of checking the liveness of the forward path and reverse path may be defined by protocols associated with Bi-directional Forwarding Detection (BFD) or Seamless BFD (S-BFD). For instance, the data object may be an S-BFD object and may include discriminator values for identifying the head-end node and tail-end node.

The computation of the forward path and reverse path may be defined by one or more protocols associated with the Path Computation Element Protocol (PCEP). The data object, for example, may include Path Setup Type (PST) Type-Length-Value (TLV) information having one or more flags for defining whether the forward path and reverse path traverse the same hops or utilize independent routes.

The instructions may further enable the processing device to configure the forward path and reverse path with the same transport type of a Multiprotocol Label Switching (MPLS) Label Switched Path (LSP). The transport type may be related to Segment Routing (SR), whereby the one or more messages may include a list of Segment Identifiers (SIDs) for defining the forward path and reverse path. In some embodiments, the data object may be listed after an LSP object in an MPLS packet of the one or more messages. Alternatively, the transport type, among other types, may be related to the Resource Reservation Protocol (RSVP), whereby the one or more messages may include Explicit Route Objects (EROs).

Furthermore, according to some embodiments, this system may be a Path Computation Client (PCC) associated with the head-end node and may be configured to a) initiate a Request to compute the forward path and reverse path and to check the liveness of the forward path and reverse path, and b) send the Request to a server arranged in a control plane for coordinating path computation and path liveness checking with the head-end node and tail-end node. Alternatively, the system may be a Path Computation Element (PCE) associated with a server arranged in a control plane and may be configured to a) send a first Initiate packet regarding the forward path to the head-end node via the control plane, and b) send a second Initiate packet regarding the reverse path to the tail-end node via the control plane. As such, the PCE may further be configured to c) receive Report packets from the head-end node and tail-end node via the control plane, and d) send Update packets to the head-end node and tail-end node via the control plane.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

The present disclosure relates to systems and methods for computing paths, routes, transports, etc. between two nodes or network elements in a network. The strategy for computing paths, according to various embodiments described herein, may extend existing mechanisms and protocols for achieving path computation in an automated and trackable fashion. Furthermore, the systems and methods of the present disclosure are configured to perform a strategy for checking, validating, or verifying the liveness, continuity, or keep-alive status, of the newly computed paths, routes, or links between the end nodes.

For example, Bi-directional Forwarding Detection (BFD), as defined at least in RFC 5880, and Seamless BFD (S-BFD), as defined at least in RFC 7880, describe liveness check protocols that can be performed for links. S-BFD is a lightweight version of BFD with no state (stateless) at the tail end. Currently, there are no available mechanisms in conventional systems to use S-BFD over a transport automatically which can test forwarding in both directions using the same transport type. The mechanisms are mainly described for Segment Routing (SR). However, as described in the present disclosure, some strategies may be applicable to other transport types that can be controlled by a PCEP-compliant controller. The PCEP servers mentioned in the present disclosure may refer to stateful PCEP servers. Of note, the present disclosure contemplates any type of Segment Routing, namely Segment Routing for IPV6 (SRv6), Segment Routing for IPV4 (SRv4), Segment Routing for MPLS (SR-MPLS), and the like.

Figure 1:
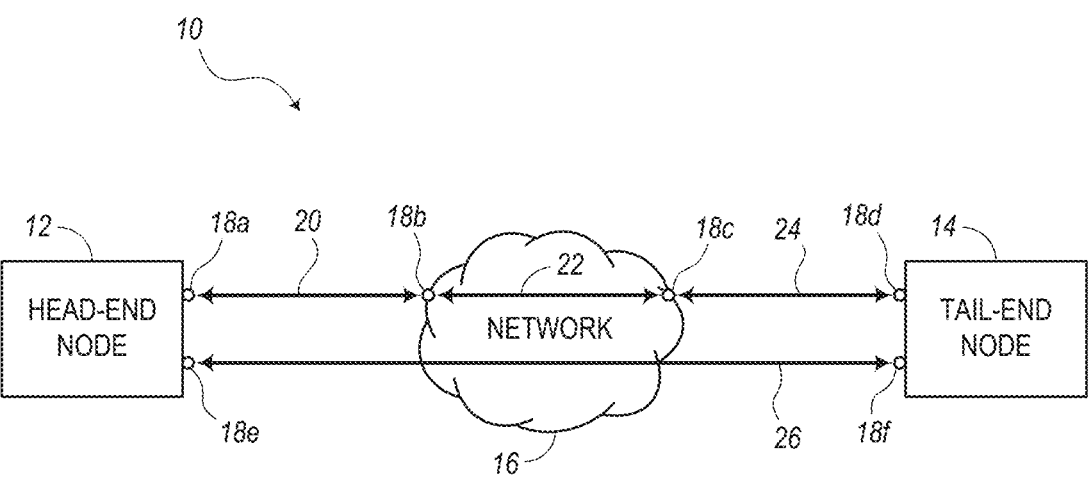
FIG. 1 is a block diagram illustrating a system including paths between a head node and a tail node, according to various embodiments.

FIG. 1 is a block diagram illustrating an embodiment of a system 10 that allows communication between nodes. As shown in FIG. 1, the system 10 simply includes a head-end node 12 and a tail-end node 14 configured to communicate with each other via a network 16. The edges of the head-end node 12, tail-end node 14, and network 16 include edge elements 18a, 18b, 18c, 18d, 18e, 18f or ports for communications in the system 10. For example, edge elements 18a and 18b are configured to communicate signals between the head-end node 12 and network 16 along a path 20 (or along a set of paths). Edge elements 18b and 18c are configured to communicate signals within the network 16 along a path 22 (or along a set of paths). Edge elements 18c and 18d are configured to communicate signals between the network 16 and the tail-end node 14 along path 24 (or along a set of paths). Also, edge elements 18e and 18f are configured to communicate signals directly between the head-end node 12 and the tail-end node 14 along path 26 (or along a set of paths) through the network 16.

The head-end node 12 and tail-end node 14 can be arranged in different administrative domains (e.g., network domains, autonomous systems, intermediate systems) of the system 10. Even in the case of being arranged in different administrative domains, the head-end node 12 and tail-end node 14 may be controlled by the same service provider. The network 16, in various embodiments, can traverse through many network sections that may be administratively opaque to the head-end node 12 and/or tail-end node 14. Configuring an end-to-end path from the head-end node 12 to the tail-end node 14 may include traversing a center portion of the system 10 (e.g., the network 16). In some embodiments, provisioning services in the system 10 may include many steps that may delay the provisioning of the service. For example, the steps may include:

1. Securing configuration privileges on the head-end node 12 and tail-end node 14 (e.g., at edge elements 18a, 18d, 18e, 18f);
2. Securing transit paths in both directions through the network, where the transit paths may:
   a) be routed along the same or independent links,
   b) be the same or different transport types;
3. Tying paths from head-end node 12 and the tail-end node 14 to the transit paths in both directions; and
4. Configuring S-BFD on the newly configured paths.

Figure 2:
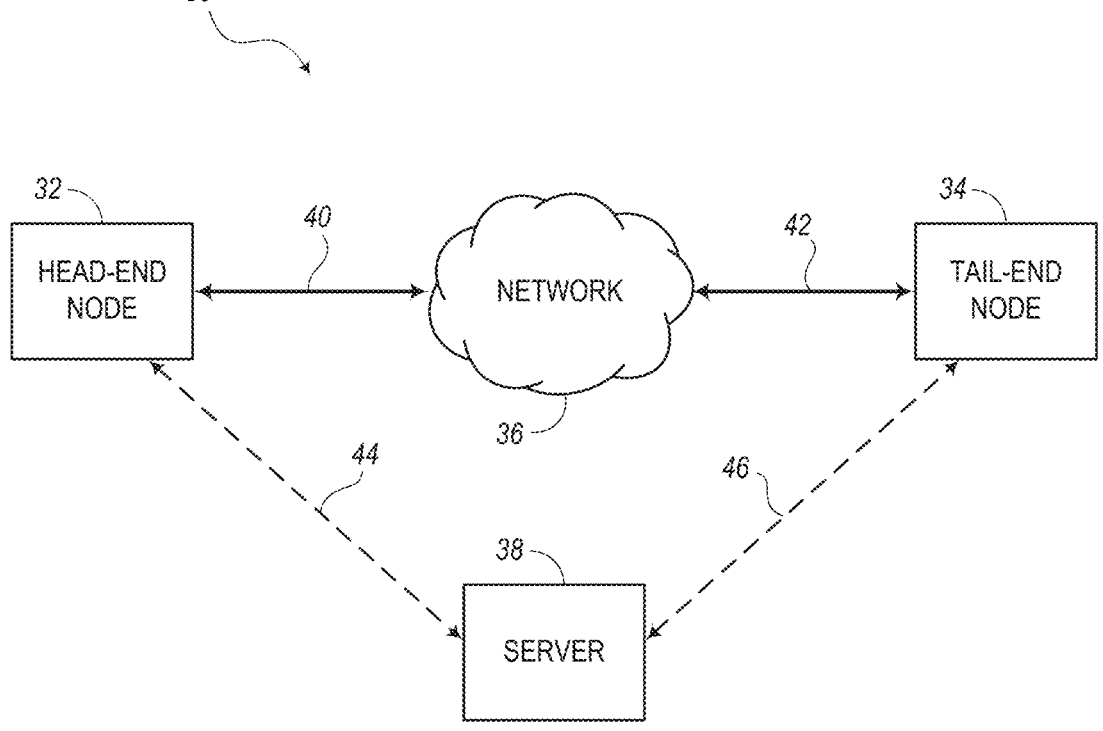
FIG. 2 is a block diagram illustrating a system for computing paths and checking the liveness of the paths, according to various embodiments of the present disclosure.

FIG. 2 is a block diagram illustrating an embodiment of a system 30 for computing paths and checking the liveness of the computed paths. This system 30 in some cases can be referred to as a preferred embodiment. Similar to the system 10 of FIG. 1, the system 30 of FIG. 2 includes a head-end node 32, a tail-end node 34, and a network 36. In addition, the system 30 includes a server 38, which may be configured as a controller-based transport management device of a transport management system. The server 38 may be arranged in a control plane for providing control signals to the head-end node 32 and tail-end node 34. The head-end node 32 and tail-end node 34 are configured to communicate with each other via sets of paths 40, 42 (e.g., paths 20, 22, 24, 26, etc.). Also, the head-end node 32 and server 38 are configured to communicate control signals to each other via a control link 44, and the tail-end node 34 and server 38 are configured to communicate control signals to each other via a control link 46.

According to various implementations, the system 30 provides a mechanism to signal an "intent" to use a link validity testing protocol (e.g., S-BFD) or other liveness or verification check. This intent to perform the test or check is incorporated in the packets or messages used during the path computation procedures when configuring path in a forward direction path from the head-end node 32 to the tail-end node 34 and when configuring a path in a reverse (or return) direction from the tail-end node 34 to the head-end node 32. This "intent" information for testing links can incorporated in the path computation packets or messages. Such inclusion in these packets is believed to be novel with respect to conventional systems. The intent information may be configured as a new "data object" (e.g., in a header) and may be referred to as a PCEP object or S-BFD object. The data object may be included in the following types of messages (packets) that may be used for communicating path computation information within the system 30:

Request (or Path Computation (PC) Request (PCRequest))

Reply (or PCReply)

Report (or PCReport)

Update (or PCUpdate)

Initiate (or PCInitiate)

The Request, Reply, Report, Update, and Initiate messages may include various path-computation packets transmitted among the different components 32, 34, 38 of the system 30, as described in more detail below. The Request, Reply, Report, Update, and Initiate messages (or path-computation packets) may include unique features based on whether an initial Request is initiated by the head-end node 32 (e.g., acting as a Path Computation Client (PCC)) or by the server 38 (e.g., acting as a Path Computation Element (PCE)) according to the PCEP. Below, the present disclosure describes two different procedures based on whether the path-computation Request packets (within which the link-checking or S-BFD features are embedded) are PCC-initiated or PCE-initiated.

In addition, the data object (e.g., PCEP object, S-BFD object, etc.) will be able to carry PATH-SETUP-TYPE (PST) Type-Length-Value (TLV) information. The PST TLV is configured to allow for the specifying or selection of the type (e.g., transport type) of the reverse (return) path to be computed. In this way, the data object (header) can allow flexibility with respect to transport types and enables a network operator to select any transport type supported by the PST TLV.

According to some embodiments, the system 30 may be configured to perform a procedure for establishing packets (e.g., Requests) to control the sub-routines of a) computing paths/routes and b) checking the liveness of these paths/ routes. In one implementation, the system 30 may be configured to create one or more messages (e.g., packets, Requests, etc.) related to a first computation of a forward path from the head-end node 32 to the tail-end node 34 and further related to a second computation of a reverse path from the tail-end node 34 to the head-end node 32. In addition, the system 30 is configured to add a data object to the one or more messages (e.g., packets, Requests, etc.), whereby the data object may include an intent to check the liveness of the forward path and reverse path.

Furthermore, the system 30 may also be configured to automatically compute the forward path and reverse path without any human intervention. The forward and reverse paths, for example, may traverse multiple administrative domains, network domains, or autonomous systems separating the head-end node 32 from the tail-end node 34. These administrative domains may separate the head-end node 32 and tail-end node 34 by one or more border nodes (e.g., edge elements 18a, 18b, 18c, 18d, 18e, 18f, transition points, gateways, etc.). The system 30 may be configured to check the liveness of the forward path and reverse path according to one or more protocols associated with BFD and/or S-BFD. In some embodiments, the data object may be configured as an S-BFD object and may include discriminator values (as defined in the S-BFD protocol) for identifying the head-end node 32 and tail-end node 34.

The system 30 may also be configured to compute the forward path and reverse path according to one or more protocols associated with PCEP. For example, the data object in this case may include Path Setup Type (PST) Type-Length-Value (TLV) information. More particularly, the PST TLV may include one or more flags (e.g., as described below with respect to FIG. 3) for defining whether the forward and reverse paths traverse the same hops (e.g., same path or route) or if they utilize independent routes.

In some embodiments, the system 30 may configure the forward path and reverse path with the same transport type, which may be defined as a Multiprotocol Label Switching (MPLS) Label Switched Path (LSP). The transport type may be related to Segment Routing (SR), whereby the one or more messages may include a list of Segment Identifiers (SIDs) for defining the forward path and reverse path. The system 30 may be configured to list the data object after an LSP object in an MPLS packet of the one or more messages. In another embodiments, the transport type may be related to the Resource Reservation Protocol (RSVP), whereby the one or more messages may include Explicit Route Objects (EROs).

According to still other embodiments, the functionality of establishing the one or more messages for path computation and liveness checking may be incorporated in a Path Computation Client (PCC) (e.g., associated with the head-end node 32). In this case, the PCC may be configured to a) initiate a Request to compute the forward path and reverse path and to check the liveness of the forward path and reverse path, and b) send the Request to the server 38, which may be arranged in a control plane for coordinating path computation and path liveness checking with the head-end node 32 and tail-end node 34. In other embodiments, the functionality of establishing the one or more message for path computation and liveness checking may be incorporated in a Path Computation Element (PCE) (e.g., associated with the server 38). In this case, the PCE may be configured to a) send a first Initiate packet regarding the forward path to the head-end node 32 via the control plane (e.g., via control link 44), and b) send a second Initiate packet regarding the reverse path to the tail-end node 34 via the control plane (e.g., via control link 46). The PCE may further be configured in this case to c) receive Report packets from the head-end node 32 (via control link 44) and tail-end node 34 (via control link 46), and d) send Update packets to the head-end node 32 and tail-end node 34 via the control plane (and control links 44, 46).

Figure 3:
FIG. 3 is a diagram illustrating a data object of a packet for computing paths and checking liveness, according to various embodiments.

FIG. 3 is a diagram illustrating an embodiment of a data object 50 that may be incorporated in a packet for computing paths and checking liveness. The data object 50 may be configured as a header or may be part of a header of the packets or messages communicated between the head-end node 32, tail-end node 34, and server 38. As shown, the data object 50 includes a "Type," which may be used to represent an object type. For example, the Internet Assigned Number Authority (IANA) may determine the Type. The data object 50 also includes a "Length," which may be used to represent the length of the payload including any attached TLVs. For example, the length may represent just PST TLV information or may represent additional information that may be supported in the future. The "Flags" may include any suitable flags for representing several aspects. In the embodiment shown in FIG. 3, the data object 50 includes two flags, labelled C and I. The C flag may represent a "Co-routed" constraint and may be set (e.g., set to 1) to indicate that both the forward and reverse paths should traverse the same hops or links. The I flag may represent an "Independent" constraint and may be set (e.g., set to 1) to indicated that both the forward and reverse paths can have independent paths. It may be noted that the I and C flags may be mutually exclusive, whereby setting both at the same time might result in invalid request and should be changed.

Figure 4:
FIG. 4 is a diagram illustrating a Path Setup Type (PST) Type-Length-Value (TLV) object for specifying a return path, according to various embodiments.

FIG. 4 is a diagram illustrating an embodiment of a Path Setup Type (PST) Type-Length-Value (TLV) object 60 (or for specifying a return path (and/or a forward path). The PST TLV object 60 may be configured as a header or may be part of a header of the packets or messages communicated between the head-end node 32, tail-end node 34, and server 38. The PST TLV object 60 may be part of the data object 50 or other suitable object included in packets, messages, Requests, etc. for computing paths and checking liveness. In some embodiments, the PST TLV object 60 may be the same or similar to the PST TLV defined in RFC 8408). The Length in the PST TLV object 60 may be updated according to the features described in the present disclosure. If the PST TLV object 60 is not present (e.g., in the data object 50), PST information may be obtained from an original request and can be used as needed.

Figure 5:
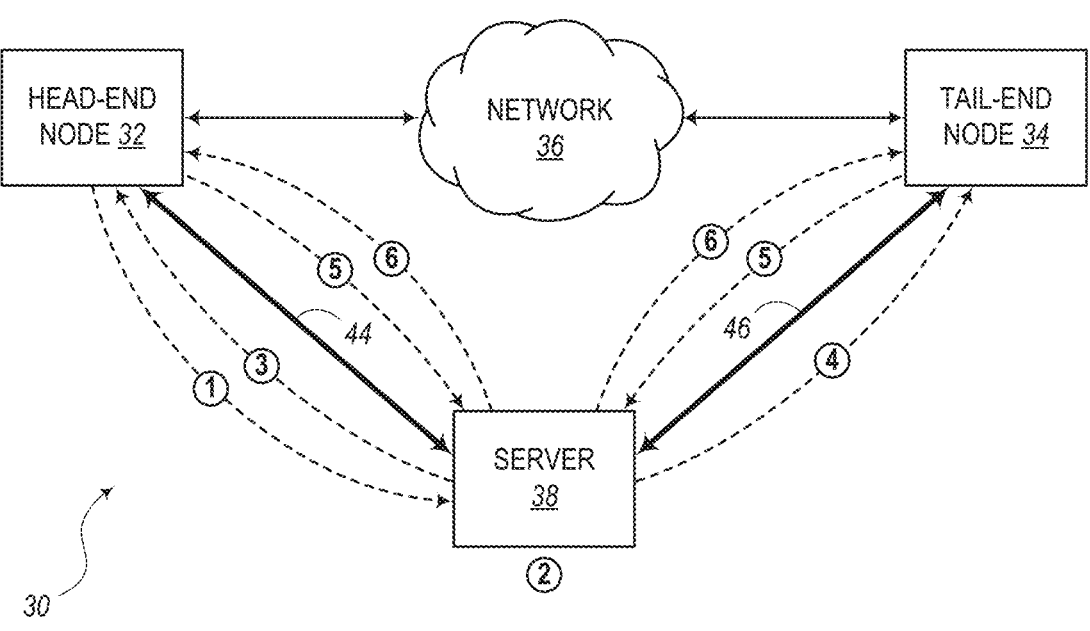
FIG. 5 is a block diagram illustrating the system of FIG. 2 along with a sequence of operations initiated by the head node, according to various embodiments.
Figure 6:
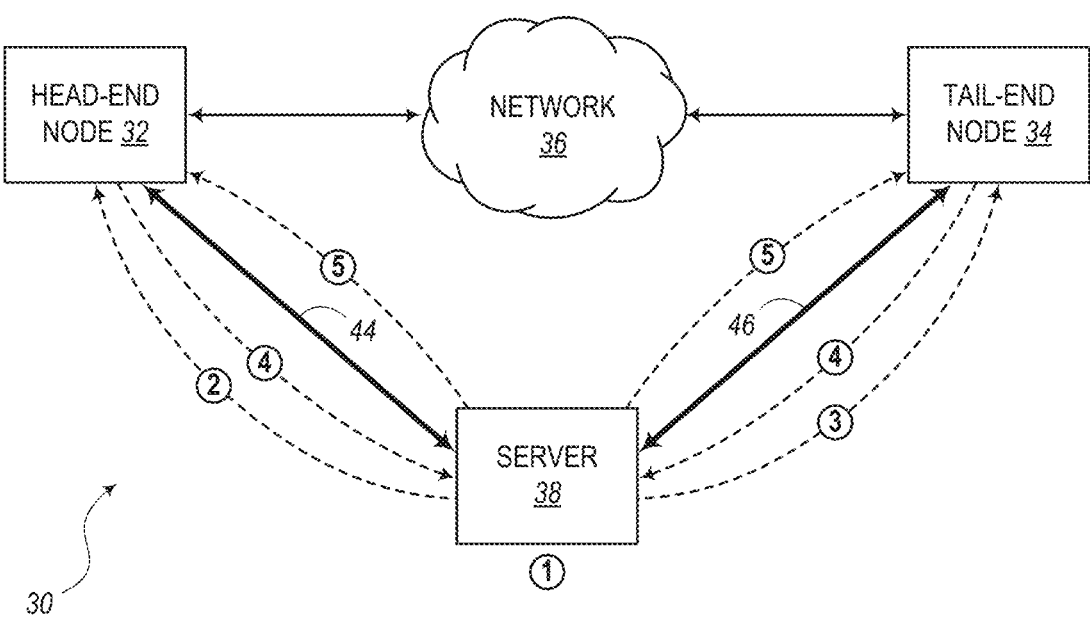
FIG. 6 is a block diagram illustrating the system of FIG. 2 along with a sequence of operations initiated by the controller, according to various embodiments.

As illustrated in FIGS. 5 and 6, two strategies for performing the various operations described in the present disclosure are depicted. The specific strategy, for example, depends on which element in the system 30 initiates a Request. For example, if the head-end node 32 initiates the Request, the strategy described with respect to FIG. 5 (e.g., the PCC-initiated strategy) is utilized. If the server 38 initiates the Request, the strategy described with respect to FIG. 6 (e.g., the PCE-initiated strategy) is utilized. Thus, the PCC-initiated Request is configured via the head-end node 32 and the PCE-initiated Request is configured via the server 38 (e.g., PCE server, PCE controller, control device, etc.). A Return path may be programmed using the Initiate message.

FIG. 5 is a block diagram illustrating the system 30 of FIG. 2 along with a sequence of operations according to an implementation of a PCC-initiated strategy. The sequence of operations is initiated by the head-end node 32. In this implementation, the PCC-initiated strategy (with numbered labels) includes:

1. Request—The head-end node 32 makes a Request (e.g., path request) with a data object (e.g., data object 50) with or without a PST TLV object (e.g., PST TLV object 60). The data object may be added after an LSP object, for example;
2. The server 38 (e.g., PCE controller) computes both the forward and reverse paths;
3. Reply—The server 38 sends a Reply message, with the data object added (e.g., after the LSP object) to the head-end node 32 with the computed forward path;
4. Initiate—The server 38 sends an Initiate message, with the data object added (e.g., after the LSP object) to the tail-end node 34 with the computed reverse path;
5. Report—both the head-end node 32 and tail-end node 34 send a Report message (with data object) to the server 38; and
6. Update—the server 38 sends an Update message (with data object) to the head-end node 32 and tail-end node 34.

FIG. 6 is a block diagram illustrating the system 30 of FIG. 2 along with a sequence of operations according to implementation of a PCE-initiated strategy. The sequence of operations is initiated by the server 38 or another suitable controller. In this implementation, the PCE-initiated strategy (with numbered labels) includes:

1. The server 38 computes both the forward and reverse paths;
2. Initiate—the server 38 sends an Initiate message to the head-end node 32, with the computed forward path and with the data object added (e.g., after LSP object);
3. Initiate—the server 38 sends an Initiate message to the tail-end node 34, with the computed reverse path and with the data object added (e.g., after LSP object);
4. Report—both the head-end node 32 and tail-end node 34 send Report messages to the server 38, including the data object after the LSP object; and
5. Update—the server 38 sends an Update message to the head-end node 32 and tail-end node 34, including the data object after the LSP object.

Figure 7:
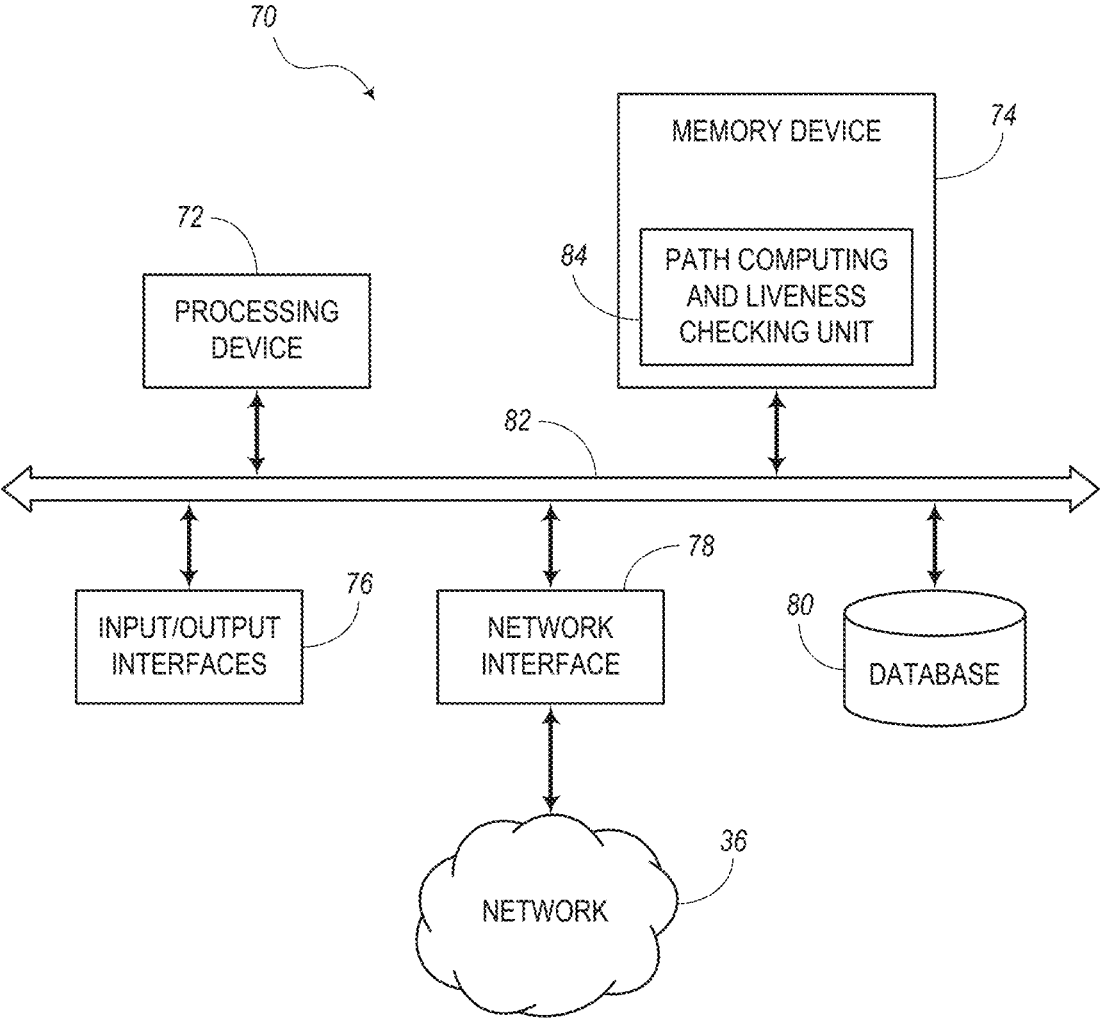
FIG. 7 is a block diagram illustrating a computing system of either the head node or controller shown in FIG. 2, according to various embodiments.

FIG. 7 is a block diagram illustrating a computing system 70 for initiating a Request as described above. The computing system 70 may represent either the head-end node 32 (shown in FIG. 5) or the server 38 (shown in FIG. 6) according to various embodiments. The computing system 70 may be configured to operate in a system (e.g., system 30) or other suitable communication networks. In the illustrated embodiment, the computing system 70 may be a digital computing device that generally includes a processing device 72, a memory device 74, Input/Output (I/O) interfaces 76, a network interface 78, and a database 80. It should be appreciated that FIG. 7 depicts the computing system 70 in a simplified manner, where some embodiments may include additional components and suitably configured processing logic to support known or conventional operating features. The components (i.e., 72, 74, 76, 78, 80) may be communicatively coupled via a local interface 82. The local interface 82 may include, for example, one or more buses or other wired or wireless connections. The local interface 82 may also include controllers, buffers, caches, drivers, repeaters, receivers, among other elements, to enable communication. Further, the local interface 82 may include address, control, and/or data connections to enable appropriate communications among the components 72, 74, 76, 78, 80.

It should be appreciated that the processing device 72, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 72 may also include or utilize stored program instructions (e.g., stored in hardware, software, and/or firmware) for control of the computing system 70 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 74 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 74 may incorporate electronic, magnetic, optical, and/or other types of storage media. The memory device 74 may have a distributed architecture, where various components are situated remotely from one another, but can be accessed by the processing device 72.

The memory device 74 may include a data store, database (e.g., database 80), or the like, for storing data. In one example, the data store may be located internal to the computing system 70 and may include, for example, an internal hard drive connected to the local interface 82 in the computing system 70. Additionally, in another embodiment, the data store may be located external to the computing system 70 and may include, for example, an external hard drive connected to the Input/Output (I/O) interfaces 76 (e.g., SCSI or USB connection). In a further embodiment, the data store may be connected to the computing system 70 through a network and may include, for example, a network attached file server.

Software stored in the memory device 74 may include one or more programs, each of which may include an ordered listing of executable instructions for implementing logical functions. The software in the memory device 74 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 72), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 72 or other suitable circuitry or logic). For example, when executed, the instructions may cause or enable the processing device 72 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 72), or any suitable combination thereof. Software/firmware modules may reside in the memory device 74, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 76 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 76 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI extended interface (PCI-X), a PCI Express interface (PCIe), an InfraRed (IR) interface, a Radio Frequency (RF) interface, and a Universal Serial Bus (USB) interface.

The network interface 78 may be used to enable the computing system 70 to communicate over a network or system (e.g., system 30), the Internet, a Wide Area Network (WAN), a Local Area Network (LAN), and the like. The network interface 78 may include, for example, an Ethernet card or adapter (e.g., 10BaseT, Fast Ethernet, Gigabit Ethernet, 10GbE) or a Wireless LAN (WLAN) card or adapter (e.g., 802.11a/b/g/n/ac). The network interface 78 may include address, control, and/or data connections to enable appropriate communications on the system 30.

Furthermore, the computing system 70 includes a path computing and liveness checking unit 84. The path computing and liveness checking unit 84 may be configured in any suitable combination of hardware, software, firmware, etc. in the processing device 72 and/or memory device 74. The path computing and liveness checking unit 84 may be stored in a non-transitory computer-readable medium, such as the memory device 74 and/or database 80. Also, the path computing and liveness checking unit 84 may include computer logic or instructions configured to enable the processing device 72 to perform certain functions and/or methodology as described in the present disclosure. For example, among other things, the path computing and liveness checking unit 84 may enable the processing device 72 to create one or more messages (or packets) related to a computation of a forward path from the head-end node 32 to the tail-end node 34 and a computation of a reverse path from the tail-end node 32 to the head-end node 34. The path computing and liveness checking unit 84 is also configured to enable the processing device 72 to add a data object to the one or more messages. For example, the data object may include an intent to check the liveness of the forward path and reverse path.

Figure 8:
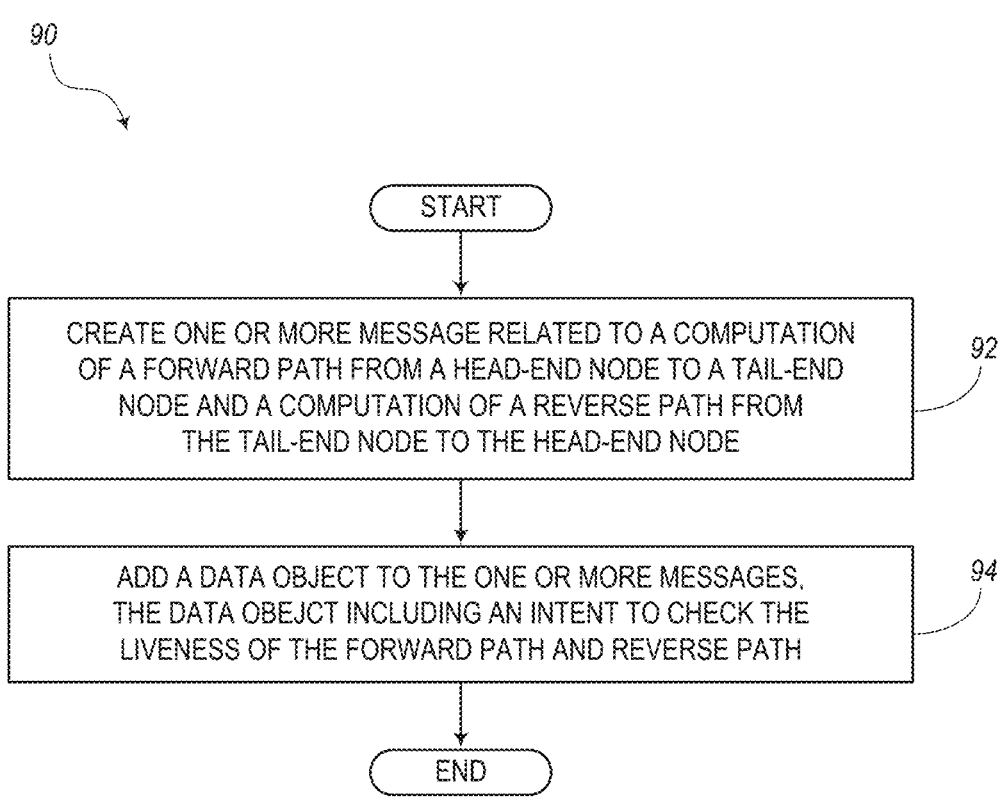
FIG. 8 is a flow diagram illustrating a process for computing paths and checking the liveness of the paths, according to various embodiments.

FIG. 8 is a flow diagram illustrating an embodiment of a process 90 for computing paths and checking the liveness of the paths. As shown in FIG. 8, the process 90 includes a step (as indicated in block 92) of creating one or more messages related to a computation of a forward path from a head-end node to a tail-end node and a computation of a reverse path from the tail-end node to the head-end node. The process 90 also includes as step (as indicated in block 94) of adding a data object to the one or more messages, where the data object includes an intent to check the liveness of the forward path and reverse path.

The process 90 may further include a step of automatically computing the forward path and reverse path. In some embodiments, the forward and reverse paths may traverse multiple administrative domains, network domains, or autonomous systems, which may be configured to separate the head-end node from the tail-end node by one or more edge element 18, border nodes, transition points, or gateways. The step of checking the liveness of the forward path and reverse path may be defined, for example, by one or more protocols associated with Bi-directional Forwarding Detection (BFD) and Seamless BFD (S-BFD). The data object may be an S-BFD object and may include discriminator values (according to the S-BFD protocol) for identifying the head-end node and tail-end node.

The steps of computing the forward path and reverse path may be defined by one or more protocols associated with the Path Computation Element Protocol (PCEP). In some embodiments, the data object may include Path Setup Type (PST) Type-Length-Value (TLV) information (e.g., as shown in FIG. 3) having one or more flags (e.g., I flag, C flag, etc.) for defining whether the forward path and reverse path traverse the same hops or utilize independent routes.

The process 90 may also include a step of configuring the forward path and reverse path with the same transport type of a Multiprotocol Label Switching (MPLS) Label Switched Path (LSP). The transport type may be related to Segment Routing (SR), whereby the one or more messages may include a list of Segment Identifiers (SIDs) for defining the forward path and reverse path. The data object may be listed after an LSP object in an MPLS packet of the one or more messages. Also, the transport type may be related to the Resource Reservation Protocol (RSVP) and the one or more messages may include Explicit Route Objects (EROs).

According to some embodiments, the process 90 may be implemented by a Path Computation Client (PCC) associated with the head-end node. In this case, the PCC may be configured to a) initiate a Request to compute the forward path and reverse path and to check the liveness of the forward path and reverse path, and b) send the Request to a server arranged in a control plane for coordinating path computation and path liveness checking with the head-end node and tail-end node. According to other embodiments, the process 90 may be implemented by a Path Computation Element (PCE) associated with a server arranged in a control plane. In this case, the PCE may be configured to a) send a first Initiate packet regarding the forward path to the head-end node via the control plane, b) send a second Initiate packet regarding the reverse path to the tail-end node via the control plane, c) receive Report packets from the head-end node and tail-end node via the control plane, and d) send Update packets to the head-end node and tail-end node via the control plane.

The embodiments of the present disclosure include a number of aspects that are considered to be novel with respect to conventional systems. For example, the systems and methods of the present disclosure introduce the data object (e.g., PCEP object, S-BFD object, etc.) configured to carry liveness checking (e.g., S-BFD) information to the participating nodes, network elements, and controllers in a system or network. The data object may be used to program the forwarding layer with paths and discriminators for use in accordance with the S-BFD protocol. The data object may be used by the PCC (or head-end node 32), PCE (or server 38), and tail-end node 34 to exchange S-BFD or other liveness checking information, particularly in path computation scenarios. The head-end node 32 can use the data object when sending a Request message for a new path and when sending Report messages. The server 38 can use the data object to receive path compute Requests which require a reverse path for S-BFD configuration.

The server 38 can also include the data object in Update messages to send path changes to the head-end node 32 and tail-end node 34. Update and Report messages can also relay changes in S-BFD discriminators using the data object (S-BFD object). The server 38 can use the data object in Initiate messages to the head-end node 32 and tail-end node 34 to setup both forward and reverse paths with the keep-alive (liveness) checking configuration.

The tail-end node 34 can receive the Initiate messages with the data object to setup the reverse path for S-BFD traffic. The tail-end node 34 can also use the Report messages with the data object to report any changes to the S-BFD discriminator values and can process the Update messages with the data object to receive Updates to the reverse path and/or S-BFD discriminators.

Therefore, the present disclosure introduces a novel way of using PST TLV information to determine transport types for the reverse paths. If PST TLV is added to the data object for the Request messages, the computed reverse path can be of a type (transport type) indicated by the PST TLV. Adding this may be optional as the forward path Request type can be used for the reverse path calculation. The systems and methods of the present disclosure enable heterogeneous path types for forward and reverse paths. The various mechanisms may be flexible enough to make use of currently supported transports as well as future transports.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A method comprising steps of:

responsive to a request for path computation and an intent to perform a liveliness check of a forward path and a reverse path subsequent to the path computation, including a data object in a path computation message where the data object includes details to program the liveliness check on the forward path and the reverse path, wherein the liveliness check utilizes Seamless BFD (S-BFD), wherein the data object comprises an S-BFD object and includes one or more discriminator values for identifying at least a head-end node and a tail-end node for the liveliness check; and transmitting the path computation message with the data object included therein, wherein the liveliness check is stateless at the tail-end node.

2. The method of claim 1, wherein the request is initiated by a head-end node with the transmitting to a Path Computation Element (PCE), and the steps further include the PCE subsequent to the path computation, transmitting path computation messages to the head-end node and a tail-end node with additional data objects to set up the liveliness check on the forward path and the reverse path.

3. The method of claim 1, wherein the transmitting is by a Path Computation Element (PCE), and the steps further include transmitting the path computation message with the data object to both a head-end node and a tail-end node to set up the liveliness check on the forward path and the reverse path.

4. The method of claim 1, wherein the steps further include utilizing the data object to program the liveliness check at a head-end node and a tail-end node.

5. The method of claim 1, wherein the path computation message is a Path Computation Element Protocol (PCEP) message.

6. The method of claim 1, wherein the path computation message is a request for a new path.

7. The method of claim 1, wherein the path computation message is an update message for an existing path.

8. The method of claim 1, wherein the data object defines a transport type of the reverse path.

9. The method of claim 1, wherein the data object defines a transport type of the reverse path that is different from a transport type of the forward path.

10. The method of claim 1, wherein the data object includes discriminator values for the liveliness check.

11. An apparatus comprising:

one or more processors, a network interface, and memory storing instructions that, when executed by the one or more processors, cause the one or more processors to responsive to a request for path computation and an intent to perform a liveliness check of a forward path and a reverse path subsequent to the path computation, include a data object in a path computation message where the data object includes details to program the liveliness check on the forward path and the reverse path, wherein the liveliness check utilizes Seamless BFD (S-BFD), wherein the data object comprises an S-BFD object and includes one or more discriminator values for identifying at least a head-end node and a tail-end node for the liveliness check; and transmit the path computation message with the data object included therein, wherein the liveliness check is stateless at the tail-end node.

12. The apparatus of claim 11, wherein the apparatus is a head-end node with the path computation message transmitted to a Path Computation Element (PCE) such that, subsequent to the path computation, the PCE transmits path computation messages to the head-end node and a tail-end node with additional data objects to set up the liveliness check on the forward path and the reverse path.

13. The apparatus of claim 11, wherein the apparatus is a Path Computation Element (PCE), and the instructions are further configured to transmit the path computation message with the data object to both a head-end node and a tail-end node to set up the liveliness check on the forward path and the reverse path.

14. The apparatus of claim 11, wherein the data object is utilized to program the liveliness check at a head-end node and a tail-end node.

15. The apparatus of claim 11, wherein the path computation message is a Path Computation Element Protocol (PCEP) message.

16. The apparatus of claim 11, wherein the path computation message is a request for a new path.

17. The apparatus of claim 11, wherein the path computation message is an update message for an existing path.

18. The apparatus of claim 11, wherein the data object defines a transport type of the reverse path.

19. The apparatus of claim 11, wherein the data object defines a transport type of the reverse path that is different from a transport type of the forward path.

20. The apparatus of claim 11, wherein the data object includes discriminator values for the liveliness check.

* * * * *